3,639,644
COLLOIDAL ASBESTOS POLYETHYLENE GREASE
Arnold J. Morway, Clark, and Albert J. Bodner, Watchung, N.J., assignors to Esso Research and Engineering Company
No Drawing. Continuation-in-part of application Ser. No. 717,939, Apr. 1, 1968. This application Mar. 19, 1969, Ser. No. 808,670
Int. Cl. C10m 1/18, 1/10
U.S. Cl. 252—13                                5 Claims

ABSTRACT OF THE DISCLOSURE

A lubricating grease comprising a major amount of lubricating oil, about 3.0 to 20.0 wt. percent of a polyethylene of a number average molecular weight of 10,000 to 50,000 and about 1 to 25.0 wt. percent of colloidal asbestos exhibits a markedly long lubrication life and excellent structural stability. A particularly suitable polyethylene is one having a number average molecular weight of between 14,000 and 18,000. The colloidal asbestos is distinguished over art-known asbestos by naturally occurring extremely small tubular fibers.

CROSS-REFERENCES TO RELATED APPLICATIONS

This application is a containuation-in-part of copending application Ser. No. 717,939, filed Apr. 1, 1968 and subsequently abandoned.

BACKGROUND OF THE INVENTION

Field of the invention

This invention is directed to a lubricating grease composition containing lubricating oil, colloidal asbestos, and polyethylene. More particularly, it is directed to a lubricating grease composition containing a naphthenic base mineral oil, colloidal asbestos, and polyethylene having a number average molecular weight of between about 10,000 to 50,000.

Description of the prior art

The use of prior natural asbestos as an ingredient in lubricating compositions is old in the art. A number of various grease formulations are taught in the book, "Lubricating Grease" by C. J. Boner, second edition, pages 687 et seq. These prior greases utilized conventional natural asbestos or asbestos floats, both of which are relatively long-fibered asbestos occurring in fibril bundles or agglomerates almost impossible to separate or deagglomerate. However, this prior fibered asbestos was always used in conjuction with other thickening agents such as soaps, since the prior long-fibered asbestos fibrils or bundles (agglomerates) are too large and that type of asbestos will not form a thickened homogeneous stable grease gel by itself but, rather, relies upon other ingredients to form the grease or gellike structure. In addition, these prior asbestos greases were often abrasive due to the large asbestos fibers. The use of polyethylene as a grease thickener is also known to the art. The difficulty encountered with this thickener is that a low number average molecular weight (up to about 50,000) polyethylene grease is structurally unstable at high temperatures and a high molecular weight (e.g. 1,000,000) polyethylene is relatively insoluble in oil.

SUMMARY OF THE INVENTION

It has now been found that a lubricating grease comprising a major amount of lubricating oil, and a minor oil-thickening amount of a combination of colloidal asbestos and low molecular weight polyethylene exhibits the desirable qualities of long lubrication life, a high dropping point, and water insolubility.

The colloidal asbestos usually forms 1 to 25, preferably 5 to 15, wt. percent of the total lubricating composition and the polyethylene usually forms 3 to 20, preferably 5 to 15, wt. percent of the total lubricating composition. The polyethylene incorporated into the grease usually is a low number average ($M_n$) molecular weight polymer, i.e., 10,000 to 50,000 mol wt. ($M_n$).

This grease thickener combination operates in a particularly unique manner. Up to temperatures of about 150° F. the polyethylene acts as the thickening agent in combination with the asbestos. Above these temperatures, where the grease would lose its structural stability due to the softening of the polyethylene, the colloidal asbestos acts as the thickening agent. Thus, the grease would have the structural stability associated with grease having high molecular weight polyethylene but with none of the solubility problems associated with those greases. Additionally, the colloidal asbestos, as opposed to art-known types of asbestos, reduces the total amount of polyethylene which would ordinarily be required to thicken the lubricating oil.

The asbestos of the present invention differs from the long-fibered, conventional asbestos in that the asbestos fibers are separate and distinct, occurring in a small colloidal size, having a large surface area, and can be dispersed in oil to form a gel by themselves and without settling out from the oil. This colloidal asbestos is chrysotile having the chemical formulation:

$$Mg_6(OH)_8Si_3O_{10}$$

The usual mode of occurrence of chrysotile is a "cross-fiber" configuration in which agglomerates of chrysotile (i.e. bundles of fibers) are closely packed together and set at right angles to the walls of cracks and fissures that extend through the host rock of the ore body. However, in 1959, an unusual deposit of chrysotile asbestos, with properties and a mode of occurrence different from the previously known cross-fiber material, was discovered in central California. The ore of this new deposit, instead of occurring in veins, occurs in randomly oriented, mattelike flakes of relatively deagglomerized visible asbestos filaments which, in turn, are made up of many thousands of extremely small tubular fibers. The lengths of these small fibers vary from a few millimicrons to thousands of millimicrons, generally 2,000 to 30,000 millimicrons, while the diameters of the fibers vary much less and are usually in the range of 1 to 80, e.g. 10 to 30 millimicrons. The colloidal asbestos, because of its physical makeup has thickening properties not demonstrated by conventional asbestos. A typical colloidal asbestos that was used in the working examples of the invention had the following characteristics:

Properties of colloidal asbestos fibers

Brightness (GE): 74–76
Refractive index: 1.55
Dispersion in water: Fully/pH range 4–6
Surface area: 47–50 sq. meters/gram
Oil absorption: 14–16 cc./10 grams of fibers
Water retention: 42 grams/20 grams of fibers
Dry bulk density: 2–2.5 lbs./cu.ft.
Fiber dimension: P.D. 25.0 millimicrons
   I.D. 6.0 millimicrons
   Length 2,500–25,000 millimicrons The polyethylene component of the grease of this invention can range in molecular weight ($M_n$) from 10,000 to 50,000; however, the preferred range is about 14,000 to 18,000. It is conceivable that polyethylene of a higher molecular weight (up to about 1,000,000) may be employed; however, solubility problems become greater and greater as the molecular weight increases. The particular advantage of polyethylene over other polyolefins is its ability to retain its thickening ability even after the grease has been used at temperatures at which the grease loses its structural stability due to the softening of the polyethylene. For example, a grease which contains the dual thickening agents described in the grease of this invention (colloidal asbestos and polyethylene) could be used at temperatures exceeding 150° F. at which point the colloidal asbestos would function as a thickener and subsequently be used at lesser temperatures where the polyethylene would again act as a thickening agent. Other polyolefins, e.g., polypropylene, polybutylene, when once used at temperatures exceeding their melting point would not retain their thickening function upon cooling. It is only polyethylene which demonstrates adequate reversibility of its structural integrity upon cooling.

Another function of the polyethylene is to increase the water resistance of the grease containing a colloidal asbestos thickener. It is believed that the polyethylene acts to prevent the preferential wetting of the colloidal asbestos which is thought to be the main cause of water solubility. These polyethylenes may be prepared either by the older high pressure system wherein pressures of 1,000 atmospheres are used to produce branched chain polyethylene or the polyethylene may be a substantially linear polyethylene produced by the newer low pressure method utilizing catalyst mixtures such as aluminum trialkyls in combination with titanium tetrachloride. Processes for production of high pressure polyethylene are well known in the art while the low pressure method is described in Ziegler's Belgian Pat. 533,362.

The lubricating oils employed to produce lubricating grease compositions in the method of this invention may be conventional grease-making mineral oils as well as synthetic lubricating oils. The synthetic oils include synthetic lubricating oils having a viscosity of at least 30 SUS at 100° F. such as esters of monobasic acids (e.g. ester of $C_3$ Oxo alcohol with $C_8$ Oxo acid, ester of $C_{13}$ Oxo alcohol with octanoic acid, etc.), esters of dibasic acids (e.g. di-2-ethyl hexyl sebacate, dinonyl adipate, etc.), esters of glycols (e.g. $C_{13}$ Oxo acid diester of tetraethylene glycol, etc.), complex esters (e.g. the complex ester formed by reacting one mole of sebacic acid with two moles of tetraethylene glycol and two moles of 2-ethyl hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ Oxo alcohol, and one mole of $C_8$ Oxo acid), esters of phosphoric acids, (e.g., the ester formed by contacting three moles of the monomethyl ether of ethylene glycol with one mole of phosphorus oxychloride, etc.) halocarbon oils, (e.g., the polymer of chlorotrifluoroethylene containing twelve recurring units of chlorotrifluoroethylene), alkyl silicates siloxanes (e.g. methyl polysiloxanes, ethyl polysiloxanes, methyl phenyl polysiloxanes, ethyl phenyl polysiloxanes, etc.), sulfite esters (e.g. ester formed by reacting one mole of sulfur oxychloride with two moles of the methyl ether of ethylene glycol, etc.), carbonates (e.g., the carbonate formed by reacting $C_8$ Oxo alcohol with ethyl carbonate to form a half ester and reacting this half ester with tetraethylene glycol), mercaptan with formaldehyde, formals (e.g., the formal formed by reacting $C_{13}$ Oxo alcohol with formaldehyde), polyglycol-type synthetic oils (e.g., the compounds formed by condensing butyl alcohol with fourteen units of propylene oxide, etc.), or mixtures of any of the above in any proportions. Quite generally, the mineral or synthetic oils should have a viscosity within the range of about 35 to 200 SUS at 210° F. and flash points of about 350° to 600° F. Lubricating oils having a viscosity index of 100 or higher may be employed.

Various other additives may also be added to the lubricating composition in amounts of 0.1 to 10.0 wt. percent each. Such additives include lubricating oil sludge detergents and dispersants, oxidation inhibitors such as phenyl-alpha-naphthylamine, corrosion inhibitors such as sorbitan monooleate and sodium nitrite, dyes, other grease thickeners, and the like.

The lubricating grease of the present invention is usually prepared by mixing together at a temperature of about 300 to 350° F. a mixture of lubricating oil and colloidal asbestos with a mixture of mineral oil and polyolefin. The mixture of all constituents is mixed and homogenized by milling into a smooth grease. During such homogenization, lubricating oil, colloidal asbestos or polyolefin may be added to bring the amount of constituents in the grease to the desired level. The premixed mixture of lubricating oil and colloidal asbestos is prepared by mixing the constituents at a temperature of 70° to 350° F. for a period of about 0.5 to 1.0 hour or until the product is of smooth consistency. Likewise, the lubricating oil and polyolefin are mixed at a temperature of from about 300° to 350° F. for about 0.5 to 2 hours or until the product is smooth. Such preparation as described above is not exclusive and variations of the above process may be used to produce the grease of this invention. Additives such as phenyl-alpha-naphthylamine may be added to the grease of this invention just prior to the milling step.

DESCRIPTION OF THE PREFERRED
EMBODIMENTS

The invention will be further understood by the following examples which are not to be construed as a limitation on the invention.

Example

Part A.—90.0 parts by weight of a naphthenic-based mineral oil having a viscosity of 550 SUS (Saybolt Universal Seconds) at 100° F. was mixed with 10.0 parts by weight of colloidal asbestos in a grease kettle at a temperature of 100° F. for 1.0 hour. The product was a smooth, homogeneous, greaselike dispersion which was subsequently Morehouse milled. Some of the physical properties of this grease, designated as Grease A, are enumerated in the table below.

Part B.—88 parts by weight of the mineral oil described above and 10 parts by weight of a polyethylene[1] having a molecular weight ($M_n$) of about 16,000 to 18,000 were charged to a grease kettle and mixed at 350° F.

2.0 wt. percent of phenyl-alpha-naphthylamine (an art-known antioxidant) was then added and the entire composition was mixed to a homogeneous product. The properties of this grease, designated as grease B, are enumerated in the table below.

Part C.—Grease A and Grease B were mixed together and an additional amount of colloidal asbestos was added

---

[1] Du Pont Alathon 16 having a melt index of 3.7 and a 0.923 density.

to make the grease harder. The final composition of the grease designated as Grease I is set out in the table below along with some of its physical properties.

TABLE

|  | Grease A | Grease B | Grease I |
|---|---|---|---|
| Composition (parts by wt.): | | | |
| Mineral oil | 90.0 | 88.0 | 74.0 |
| Colloidal asbestos | 10.0 | | 20.0 |
| Polyethylene | | 10.0 | 5.0 |
| Phenyl-alpha-naphthylamine | | 2.0 | 1.0 |
| Properties: | | | |
| Appearance | Rough | Excellent, smooth, homogeneous. | Smooth. |
| Dropping point, °F | 500 | 150 | 400+. |
| Water solubility at 212° F | Disintegrates | | Stable. |

The water solubility test procedure is as follows: One gram of grease is placed in 100 ml. of water and the temperature raised to boiling (212° F.) and held for one-half hour. The grease is considered as water-insoluble if no appreciable disintegration occurs.

Note that the grease containing the colloidal asbestos alone, while having a thickening effect and demonstrating a relatively high dropping point, was relatively soluble in water. This indicates that such a grease could not be used in services encountering a high degree of moisture. The grease containing the polyethylene had a relatively low dropping point indicating limitations of its use to low temperature services. It can be seen, however, that a grease containing both the colloidal asbestos and polyethylene exhibited both a high dropping point and water insolubility.

What is claimed is:
1. A lubricating grease composition comprising:
   (a) a major amount of lubricating oil;
   (b) about 1 to about 25 wt. percent of colloidal asbestos, characterized as having naturally occurring fibers with a particle outer diameter of about 1 to 80 millimicrons and a particle length of about 2,000 to 30,000 millimicrons; and
   (c) about 3 to about 20 wt. percent of polyethylene having a number average molecular weight of between about 10,000 and 50,000;
   said weight percents being based on the total composition.

2. A lubricating composition as in claim 1 wherein said colloidal asbestos is present in amounts of about 5 to 15 wt. percent of the total lubricating composition and the polyethylene is present in amounts of about 5 to 15 wt. percent of the total amount of the lubricating composition.

3. A lubricating oil as in claim 1 wherein the polyethylene has a number average molecular weight of between about 14,000 and 18,000.

4. A lubricating composition as in claim 1 wherein the lubricating oil is a mineral oil.

5. A lubricating composition as in claim 1 which comprises in addition a minor amount of phenyl-alpha-naphthylamine.

References Cited

UNITED STATES PATENTS

| 1,133,204 | 3/1915 | Warrell | 252—13 |
| 2,810,695 | 10/1957 | Young et al. | 252—28 |
| 2,887,472 | 5/1959 | Fotis | 252—59 |
| 3,010,896 | 11/1961 | Odell et al. | 252—13 |
| 3,112,270 | 11/1963 | Mitacek et al. | 252—59 |
| 3,112,297 | 11/1963 | Gordon et al. | 252—59 |

DANIEL F. WYMAN, Primary Examiner

I. VAUGHN, Assistant Examiner

U.S. Cl. X.R.

252—28, 59